US012286695B2

(12) United States Patent
Kwon et al.

(10) Patent No.: US 12,286,695 B2
(45) Date of Patent: Apr. 29, 2025

(54) FE-BASED NANOCRYSTALLINE ALLOY AND ELECTRONIC COMPONENT USING THE SAME

(71) Applicant: SAMSUNG ELECTRO-MECHANICS CO., LTD., Suwon-si (KR)

(72) Inventors: Sang Kyun Kwon, Suwon-si (KR); Chang Ryul Jung, Suwon-si (KR); Jong Ho Chung, Suwon-si (KR); Jung Young Cho, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 779 days.

(21) Appl. No.: 15/808,952

(22) Filed: Nov. 10, 2017

(65) Prior Publication Data

US 2018/0171444 A1 Jun. 21, 2018

(30) Foreign Application Priority Data

Dec. 15, 2016 (KR) ........................ 10-2016-0171776
Mar. 13, 2017 (KR) ........................ 10-2017-0031341

(51) Int. Cl.
*H01F 1/153* (2006.01)
*C21D 6/00* (2006.01)
(Continued)

(52) U.S. Cl.
CPC .............. *C22C 38/16* (2013.01); *C21D 6/008* (2013.01); *C22C 38/02* (2013.01); *C22C 38/12* (2013.01);
(Continued)

(58) Field of Classification Search
CPC ..... C22C 2200/04; C22C 38/02; C22C 38/12; C22C 38/16; C22C 2202/02; C21D 6/008;
(Continued)

(56) References Cited

U.S. PATENT DOCUMENTS 6,235,129 B1 * 5/2001 Kojima ................. H01F 1/0571 75/242
2001/0022208 A1 * 9/2001 Perepezko .............. C22C 45/08 148/403

(Continued)

FOREIGN PATENT DOCUMENTS

CN 1781624 A 6/2006
CN 101263240 A 9/2008

(Continued)

OTHER PUBLICATIONS https://www.mathbootcamps.com/common-shapes-of-distributions; obtained on Feb. 2020.*

(Continued)

*Primary Examiner* — Holly Rickman
*Assistant Examiner* — Lisa Chau
(74) *Attorney, Agent, or Firm* — NSIP Law

(57) ABSTRACT

An Fe-based nanocrystalline alloy is represented by a Compositional Formula, $Fe_xB_ySi_zM_\alpha A_\beta$, wherein M is one or more elements selected from the group consisting of Nb, V, W, Ta, Zr, Hf, Ti, and Mo; A is one or more elements selected from the group consisting of Cu and Au, x, y, z, α, and β (based on atom %) satisfy the following conditions: $75\% \leq x \leq 81\%$, $7\% \leq y \leq 13\%$, and $4\% \leq z \leq 12\%$, and a peak in a differential scanning calorimetry (DSC) graph has a bimodal shape.

14 Claims, 3 Drawing Sheets

(51) Int. Cl.

*C22C 38/02* (2006.01)
*C22C 38/12* (2006.01)
*C22C 38/16* (2006.01)
*H01F 1/147* (2006.01)
*H01F 27/245* (2006.01)
*H01F 27/36* (2006.01)
*H01F 38/14* (2006.01)

(52) U.S. Cl.

CPC ..... *H01F 1/14775* (2013.01); *H01F 1/15308* (2013.01); *H01F 1/15333* (2013.01); *H01F 27/245* (2013.01); *H01F 27/36* (2013.01); *H01F 27/366* (2020.08); *H01F 38/14* (2013.01); *C22C 2200/04* (2013.01); *C22C 2202/02* (2013.01)

(58) Field of Classification Search

CPC ............. H01F 1/14775; H01F 1/14766; H01F 1/15308; H01F 1/15333; H01F 27/245; H01F 27/2823; H01F 27/365; H01F 38/14; H02J 7/025

See application file for complete search history.

(56) References Cited

U.S. PATENT DOCUMENTS

| | | | | |
|---|---|---|---|---|
| 2006/0137778 | A1* | 6/2006 | Munir | C22F 3/02 148/561 |
| 2008/0196795 | A1 | 8/2008 | Waeckerle et al. | |
| 2010/0043927 | A1 | 2/2010 | Makino | |
| 2010/0092329 | A1* | 4/2010 | Branagan | C22C 1/11 164/47 |
| 2012/0073710 | A1* | 3/2012 | Kim | C22C 38/002 148/548 |
| 2012/0262266 | A1* | 10/2012 | Herzer | H01F 1/14766 336/233 |
| 2012/0318412 | A1* | 12/2012 | Ohta | C21D 8/1211 148/548 |
| 2014/0152416 | A1 | 6/2014 | Herzer et al. | |
| 2015/0159256 | A1* | 6/2015 | Shimizu | C21D 6/008 148/112 |

FOREIGN PATENT DOCUMENTS

| | | | | | |
|---|---|---|---|---|---|
| CN | 101371321 | A | | 2/2009 | |
| CN | 102741437 | A | | 10/2012 | |
| CN | 102822372 | A | | 12/2012 | |
| CN | 103748250 | A | | 4/2014 | |
| DE | 10 2012 218 657 | A1 | | 5/2014 | |
| EP | 1 045 402 | A2 | | 10/2000 | |
| EP | 1 925 686 | A1 | | 5/2008 | |
| EP | 2 557 190 | A1 | | 2/2013 | |
| EP | 2 733 230 | A1 | | 5/2014 | |
| JP | 01156451 | A | * | 6/1989 | H01F 1/15308 |
| JP | 2013-065827 | A | | 4/2013 | |
| JP | 5720674 | B2 | | 5/2015 | |
| JP | 6041207 | B2 | | 12/2016 | |
| KR | 10-1607483 | B1 | | 3/2016 | |
| WO | WO 2016/112011 | A1 | | 7/2016 | |

OTHER PUBLICATIONS

The value of all peaks in DSC curve found to have negavtive value of heat flow. why? https://www.researchgate.net/post/The_value_of_all_peaks_in_DSC_curve_found_to_have_negavtive_value_of_heat_flow_why#:~:text=If%20your%20material%20has%20an,peaks%20are%20in%20negative%20direction, obtained on Apr. 2022.*

Investigation of Polymers with Differential Scanning Calorimetry https://polymerscience.physik.hu-berlin.de/docs/manuals/DSC.pdf, obtained on Apr. 2022.*

Chinese Office Action issued on Nov. 20, 2019 in counterpart Chinese Patent Application No. 201711348229.4 (13 pages in English and 9 pages in Chinese).

Chinese Office Action dated Jul. 24, 2020 issued in the corresponding Chinese Patent Application No. 201711348229.4 (14 pages in English, 9 pages in Chinese).

Wang, Zhi, et al. "Heating rate dependence of magnetic properties for Fe-based nanocrystalline alloys." *Journal of magnetism and magnetic materials* 171.3 (1997): 300-304. (5 pages in English).

Chinese Office Action issued on Jan. 21, 2021 in counterpart Chinese Patent Application No. 201711348229.4 (13 pages in English, 8 pages in Chinese).

Korean Office Action Issued on Mar. 12, 2021 in counterpart Korean Patent Application No. 10-2017-0031341 (4 pages in English, 4 pages in Korean).

* cited by examiner

FE-BASED NANOCRYSTALLINE ALLOY AND ELECTRONIC COMPONENT USING THE SAME

CROSS-REFERENCE TO RELATED APPLICATION(S)

This application claims benefit of priority under 35 USC § 119 to Korean Patent Application Nos. 10-2016-0171776 filed on Dec. 15, 2016 and 10-2017-0031341 filed on Mar. 13, 2017 in the Korean Intellectual Property Office; the entire disclosures of which are incorporated herein by reference for all purposes.

BACKGROUND

1. Field

The description relates to a Fe-based nanocrystalline alloy and an electronic component using the same.

2. Description of Related Art

In technical fields such as an inductor, a transformer, a motor magnetic core, a wireless power transmission device, and the like, the development of a soft magnetic material having small size and improved high frequency characteristics has been attempted. Recently, Fe-based nanocrystalline alloys have come to prominence.

An Fe-based nanocrystalline alloy has advantages in that it has high permittivity and a saturation magnetic flux density twice as high as that of existing ferrite, and it operates at a high frequency as compared to an existing metal.

However, since there exist limitations in the performance of Fe-based nanocrystalline alloys, recently, a novel nanocrystalline alloy composition for improving saturation magnetic flux density has been developed. Particularly, in magnetic induction type wireless power transmission equipment, a magnetic material is used to decrease influence of electromagnetic interference (EMI)/electromagnetic compatibility (EMC) caused by surrounding metal material and improve wireless power transmission efficiency.

As the magnetic material, for efficiency improvement, slimness and lightness of a device, and particularly, high speed charging capability, a magnetic material having a high saturation magnetic flux density has been used. However, the magnetic material having a high saturation magnetic flux density has a high loss and generates heat, such that there is are limitations in using these magnetic materials.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure may provide an Fe-based nanocrystalline alloy having low loss while having a high saturation magnetic flux density, and an electronic component using the same.

In one general aspect, an Fe-based nanocrystalline alloy is represented by the Formula, $Fe_xB_ySi_zM_\alpha A_\beta$, where M is one or more elements selected from the group consisting of Nb, V, W, Ta, Zr, Hf, Ti, and Mo; A is one or more elements selected from the group consisting of Cu and Au; and x, y, z, α, and β (based on atom %) satisfy the following conditions: 75%≤x≤81%, 7%≤y≤13%, and 4%≤z≤12%, respectively, and a contour in a differential scanning calorimetry (DSC) graph has a bimodal shape.

The Fe-based nanocrystalline alloy Formula may have 16%≤y+z≤22%. The Fe-based nanocrystalline alloy Formula may have 1.5%≤α≤3%. The Fe-based nanocrystalline alloy Formula may have 0.1%≤β≤1.5%. The Fe-based nanocrystalline alloy may have a saturation magnetic flux density of 1.4 T or more.

The Fe-based nanocrystalline alloy Formula may have M as Nb. The Fe-based nanocrystalline alloy formula may have A as Cu. The Fe-based nanocrystalline alloy may be subject to a heat treatment including raising the temperature from about room temperature to about 500° C. to 600° C., for about 0.5 to about 1.5 hours, at a heating rate of approximately 50 K/m in or greater.

In a general aspect, an electronic component includes a coil part, and a magnetic sheet disposed to be adjacent to the coil part, wherein the magnetic sheet contains an Fe-based nanocrystalline alloy represented by the Formula, $Fe_xB_ySi_zM_\alpha A_\beta$, where M is one or more elements selected from the group consisting of Nb, V, W, Ta, Zr, Hf, Ti, and Mo; A is one or more elements selected from the group consisting of Cu and Au; x, y, z, α, and β (based on atom %) satisfy the following conditions: 75%≤x≤81%, 7%≤y≤13%, and 4%≤z≤12%, respectively, and a contour in a differential scanning calorimetry (DSC) graph has a bimodal shape.

The electronic component may include the Fe-based nanocrystalline alloy wherein 16%≤y+z≤22%. The electronic component may include the Fe-based nanocrystalline alloy wherein 1.5%≤α≤3%. The electronic component may include the Fe-based nanocrystalline alloy wherein 0.1%≤β≤1.5%. The electronic component may include the Fe-based nanocrystalline alloy with a saturation magnetic flux density of 1.4 T or more. The electronic component may include the Fe-based nanocrystalline alloy wherein M is Nb. The electronic component may include the Fe-based nanocrystalline alloy wherein A is Cu.

In one general aspect, a process of making a Fe-based nanocrystalline alloy represented by the Formula, FexBySizMαAβ, where M is one or more elements selected from the group consisting of Nb, V, W, Ta, Zr, Hf, Ti, and Mo; A is one or more elements selected from the group consisting of Cu and Au; and x, y, z, α, and β (based on atom %) satisfy the following conditions: 75%≤x≤81%, 7%≤y≤13%, and 4%≤z≤12%, respectively, and a peak in a differential scanning calorimetry (DSC) graph has a bimodal shape, includes subjecting the Fe-based nanocrystalline alloy to a heat treatment including raising the temperature from about room temperature to about 500° C. to 600° C., for about 0.5 to about 1.5 hours, at a heating rate of approximately 50 K/min or greater.

The process of making the Fe-based nanocrystalline alloy may include making the Fe-based nanocrystalline alloy wherein 16%≤y+z≤22%. The process of making the Fe-based nanocrystalline alloy may include making the Fe-based nanocrystalline alloy wherein 1.5%≤α≤3%. The process of making the Fe-based nanocrystalline alloy may include making the Fe-based nanocrystalline alloy wherein 0.1%≤β≤1.5%. The process of making the Fe-based nanocrystalline alloy may include making the Fe-based nanocrystalline alloy having a saturation magnetic flux density of 1.4 T or more.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
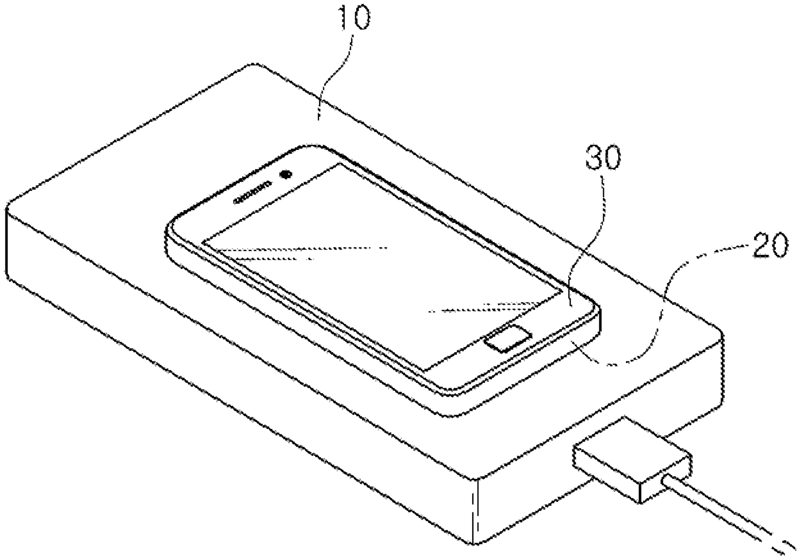
FIG. 1 is perspective view illustrating an exterior of a general wireless charging system.

A wireless charging system will be described as an example of a device in which a Fe-based nanocrystalline alloy according to an embodiment may be used. FIG. 1 is perspective view schematically illustrating an exterior of a general wireless charging system, while FIG. 2 is an exploded cross-sectional view illustrating internal configurations of FIG. 1.

Figure 2:
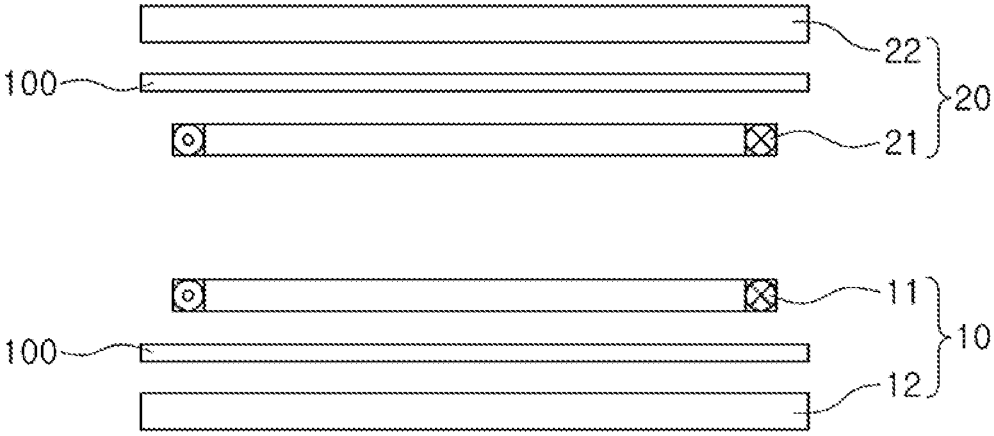
FIG. 2 is an exploded cross-sectional view illustrating main internal configurations of FIG. 1.

Referring to FIGS. 1 and 2, a general wireless charging system includes a wireless power transmission device 10 and a wireless power reception device 20, wherein the wireless power reception device 20 may be included in an electronic apparatus 30 such as a portable phone, a notebook PC, a desktop PC, or the like.

Describing an interior of the wireless power transmission device 10, a transmitter coil 11 may be formed on a substrate 12, such that when an alternating current voltage is applied to the wireless power transmission device 10, a magnetic field may be formed therearound. Therefore, electromotive force may be induced in a receiver coil 21 embedded in the wireless power reception device 20 from the transmitter coil 11, such that a battery 22 may be charged.

The battery 22 may be a rechargeable nickel hydrogen battery or lithium ion battery, but is not particularly limited thereto. Further, the battery 22 may be configured separately to the wireless power reception device 20 to thereby be implemented so as to be detachable from the wireless power reception device 20. Alternatively, the battery 22 and the wireless power reception device 20 may be implemented integrally with each other.

The transmitter coil 11 and the receiver coil 21 may be electromagnetically coupled to each other and formed by winding a metal wire such as a copper wire. In this case, the metal wire may be wound in a circular shape, an oval shape, a rectangular shape, a trapezoidal shape and an overall size or turns of the metal wire may be suitably controlled and set depending on desired characteristics.

A magnetic sheet 100 is disposed between the receiver coil 21 and the battery 22 and between the transmitter coil 11 and the substrate 12. The magnetic sheet 100 may shield a magnetic flux formed in a central portion of the transmitter coil 11, and in an embodiment in which the magnetic sheet is disposed to be adjacent to a receiver, the magnetic sheet 100 may be positioned between the receiver coil 21 and the battery 22 to collect and transmit the magnetic flux, thereby allowing the magnetic flux to be efficiently received in the receiver coil 21. In addition, the magnetic sheet 100 may serve to block at least a portion of the magnetic flux from reaching the battery 22.

The magnetic sheet 100 as described above may be coupled to a coil part to thereby be applied to a receiver, or the like, of a wireless charging device as described above. Further, the coil part may also be used in magnetic secure transmission (MST), near field communications (NFC), or the like, in addition to the wireless charging device. Hereinafter, an Fe-based nanocrystalline alloy configuring the magnetic sheet 100 will be described in more detail.

In an example in which an Fe-based nanocrystalline alloy having a specific composition was suitably heat-treated, two types of crystallinity were exhibited. This composition had a high saturation magnetic flux density, and excellent soft magnetic properties. In detail, the Fe-based nanocrystalline alloy is represented by the Formula, $Fe_xB_ySi_zM_\alpha A_\beta$, where M is at least one element selected from the group consisting of Nb, V, W, Ta, Zr, Hf, Ti, and Mo; A is at least one element selected from the group consisting of Cu and Au; and x, y, z, α, and β (based on atom %), satisfy the following conditions: 75%≤x≤81%, 7%≤y≤13%, and 4%≤z≤12%, respectively, and a contour in a differential scanning calorimetry (DSC) graph has a bimodal shape. That is, the Fe-based nanocrystalline alloy has a bimodal crystallization energy tendency or profile having two peaks in a crystallization temperature range.

Further, the Fe-based nanocrystalline alloy may satisfy one or more of the following conditions. Accordingly, the bimodal crystallization energy tendency, permeability, and the like, may be further improved.

$$16\% \le y+z \le 22\% \quad (1)$$

$$1.5\% \le \alpha \le 3\% \quad (2)$$

$$0.1\% \le \beta \le 1.5\% \quad (3)$$

The following Table 1 illustrates shapes of primary contours and crystallization onset temperature in examples of changing the composition of the Fe-based nanocrystalline alloy.

TABLE 1

| | Composition (at %) | | | | | First Contour | |
|---|---|---|---|---|---|---|---|
| | Fe | Si | B | Nb | Cu | Shape | Crystallization Onset Temperature (° C.) |
| Comparative Example 1 | 73.5 | 15.5 | 7 | 3 | 1 | mono | 512 |
| Comparative Example 2 | 74.5 | 14.5 | 7 | 3 | 1 | mono | 508 |
| Inventive Example 1 | 77 | 11 | 9.5 | 2 | 0.5 | bimodal | 500 |
| Inventive Example 2 | 81 | 4 | 12 | 2.5 | 0.5 | bimodal | 499 |
| Inventive Example 3 | 81 | 5 | 13 | 0.5 | 0.5 | bimodal | 480 |
| Inventive Example 4 | 75 | 12 | 7 | 3 | 1 | bimodal | 470 |
| Comparative Example 3 | 82 | 3 | 11 | 3 | 1 | mono | 472 |
| Comparative Example 4 | 76 | 14 | 7 | 2 | 1 | mono | 468 |
| Comparative Example 5 | 77 | 8 | 9 | 5 | 1 | bimodal | 520 |

Characteristics of the compositions obtained in the examples were confirmed by thermal analysis. In detail, differential thermal analysis (DTA) for observing crystallization and melting point of a metal by evaluating heat generation and heat absorption in a temperature range of about room temperature to about 1300° C. was used. Thermal analysis was performed on a sample of each composition at a heating rate of about 40 K/m in, and the results are illustrated in differential scanning calorimetry (DSC) graphs of FIGS. 3 and 4. The graph of FIG. 3 corresponds to the composition of Example 2, and the graph of FIG. 4 corresponds to the composition of Comparative Example 1.

heating rate is relatively high, permeability was increased, and core loss was also decreased. In general, an Fe-based nanocrystalline alloy is prepared in an amorphous phase, and when forming a Fe-crystalline grain to have a size of about 10 to 20 nm through heat treatment, excellent magnetic properties may be obtained. In this case, it is known that heat treatment temperature and heat treatment time are important variables in forming nanocrystalline grains, but in the Fe-based nanocrystalline alloy in the above-mentioned compositional range, formation of a nanocrystalline grain was affected by the heating rate of the heat treatment.

Experimental results in Table 2 illustrate permeability and core loss depending on the compositions of Fe-based nanocrystalline grains and heating rate. A specific heat treatment method is as follows. In order to suppress oxidation, a heat treatment is performed under an inert atmosphere, and is generally performed in a specific temperature range of at most about 500° C. to 600° C. for about 0.5 to 1.5 hours while raising a temperature from room temperature at two heating rates of about 10 K/min and about 50 K/min, as illustrated in Table 2. However, optimal heat treatment temperature may be changed, depending on specifics of the composition, and the temperature is affected by crystallization onset temperature. The present inventors performed heat treatment at a temperature at which maximum permeability was exhibited in a range of about 500° C. to about 600° C. per each composition, and a retention time was unified at 0.5 hours. Here, as illustrated in the results of Table 2, in examples of the compositions in which monomodal crystallization heat generation peaks were exhibited as a thermal analysis result, differences in permeability and loss were not large, regardless of the heating rate, but in cases of the compositions in which two or more peaks were exhibited in bimodal shapes, when the heating rate was high, permeability tended to increase and the loss tended to be decreased.

TABLE 2

| | Composition (at %) | | | | | Flux density | Heating rate (° C./min) | Permeability (@1 kHz) | Core Loss (@100 kHz) |
|---|---|---|---|---|---|---|---|---|---|
| | Fe | Si | B | Nb | Cu | | | | |
| Comparative Example 1 | 73.5 | 15.5 | 7 | 3 | 1 | 1.2T | 10 | 47k | 320 |
| | | | | | | | 50 | 42k | 315 |
| Comparative Example 2 | 74.5 | 14.5 | 7 | 3 | 1 | 1.3T | 10 | 34k | 340 |
| | | | | | | | 50 | 32k | 338 |
| Inventive Example 1 | 77 | 11 | 9.5 | 2 | 0.5 | 1.4T | 10 | 16k | 560 |
| | | | | | | | 50 | 30k | 460 |
| Inventive Example 2 | 81 | 4 | 12 | 2.5 | 0.5 | 1.5T | 10 | 15k | 570 |
| | | | | | | | 50 | 28k | 470 |
| Inventive Example 3 | 81 | 5 | 13 | 0.5 | 0.5 | 1.6T | 10 | 10k | 810 |
| | | | | | | | 50 | 22k | 680 |
| Inventive Example 4 | 75 | 12 | 7 | 3 | 1 | 1.4T | 10 | 17k | 620 |
| | | | | | | | 50 | 35k | 420 |
| Comparative Example 3 | 82 | 3 | 11 | 3 | 1 | 1.5T | 10 | 5k | 1410 |
| | | | | | | | 50 | 4.8k | 1480 |
| Comparative Example 4 | 76 | 14 | 7 | 2 | 1 | 1.3T | 10 | 5k | 1800 |
| | | | | | | | 50 | 5.2k | 1710 |
| Comparative Example 5 | 77 | 8 | 9 | 5 | 1 | 1.4T | 10 | 8k | 2100 |
| | | | | | | | 50 | 8k | 2250 |

Figure 3:
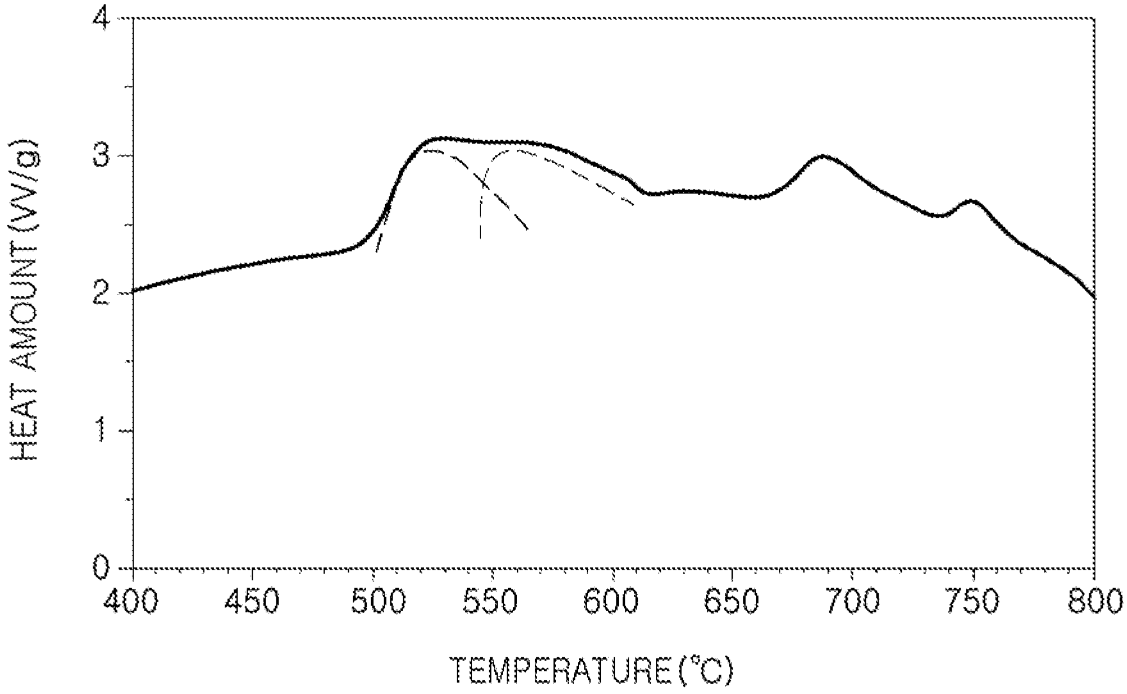
FIGS. 3 and 4 are graphs illustrating thermal analysis results of compositions according to an Example and Comparative Example.
Figure 4:
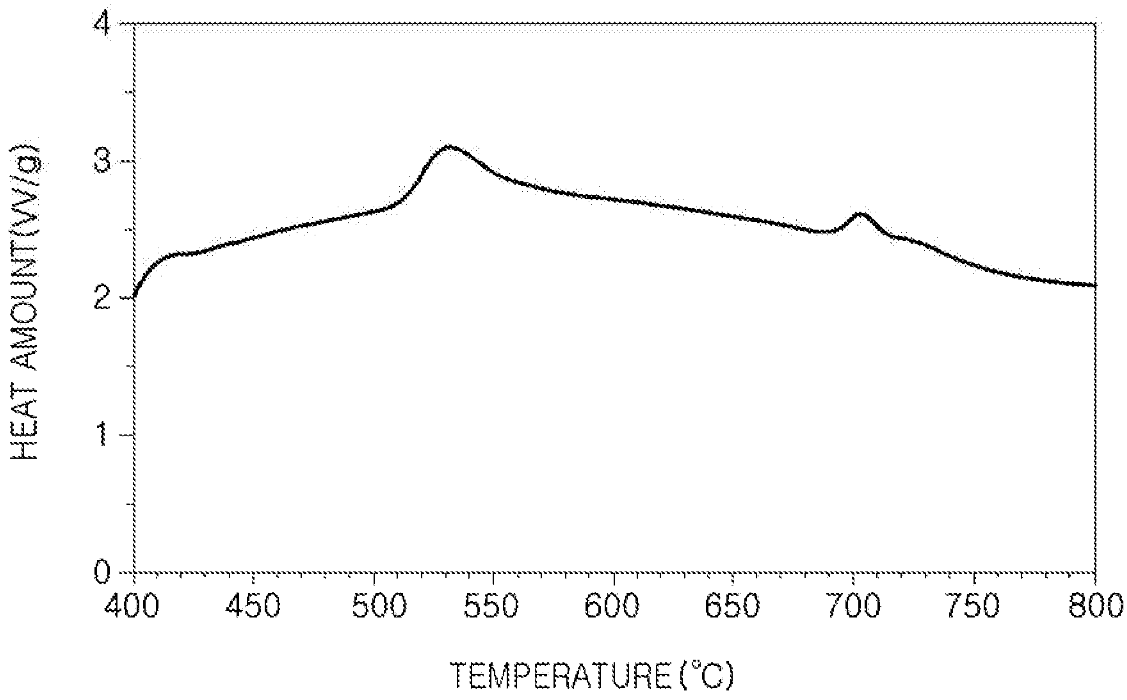

Comparing the Examples and Comparative Examples with reference to Tables 1 and 2 and the graphs of FIGS. 3 and 4, the Fe-based nanocrystalline alloy having the composition of the embodiment exhibited a bimodal crystallization energy tendency in a primary crystallization energy band.

Figure 5:
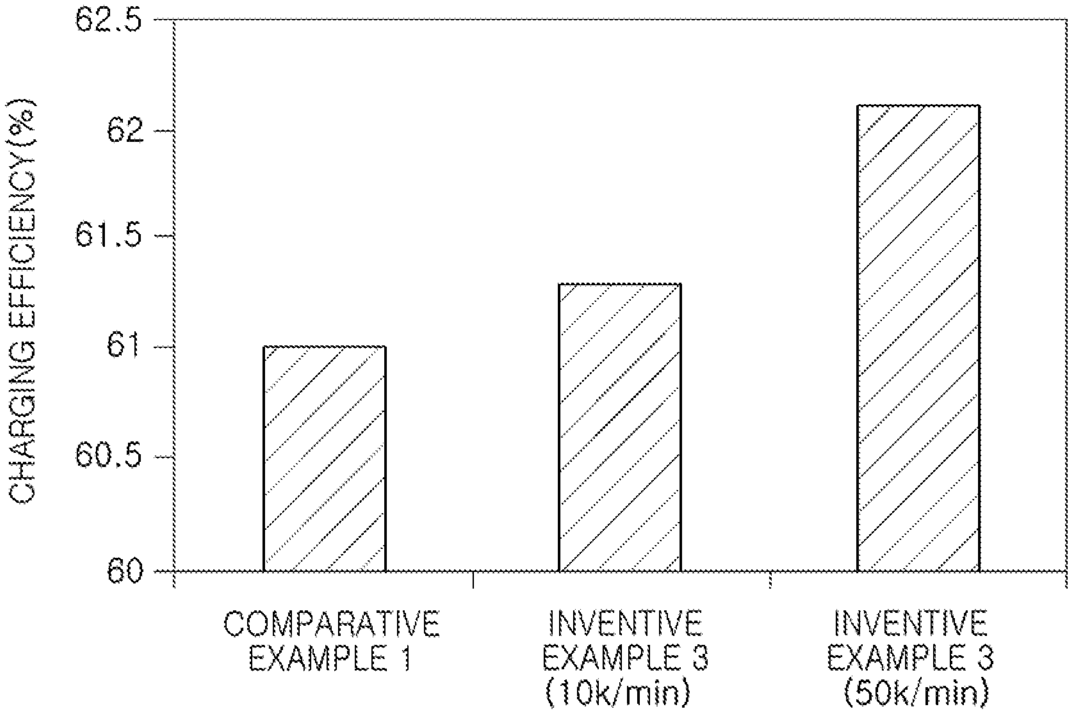
FIGS. 5 and 6 illustrate results obtained by comparing wireless charging efficiency of magnetic sheets formed of Fe-based nanocrystalline alloys according to Examples and Comparative Example, wherein the result in FIG. 5 is measured using a power matters alliance (PMA) method, and the result in FIG. 6 is measured using an alliance for wireless power (A4WP) method.
Figure 6:
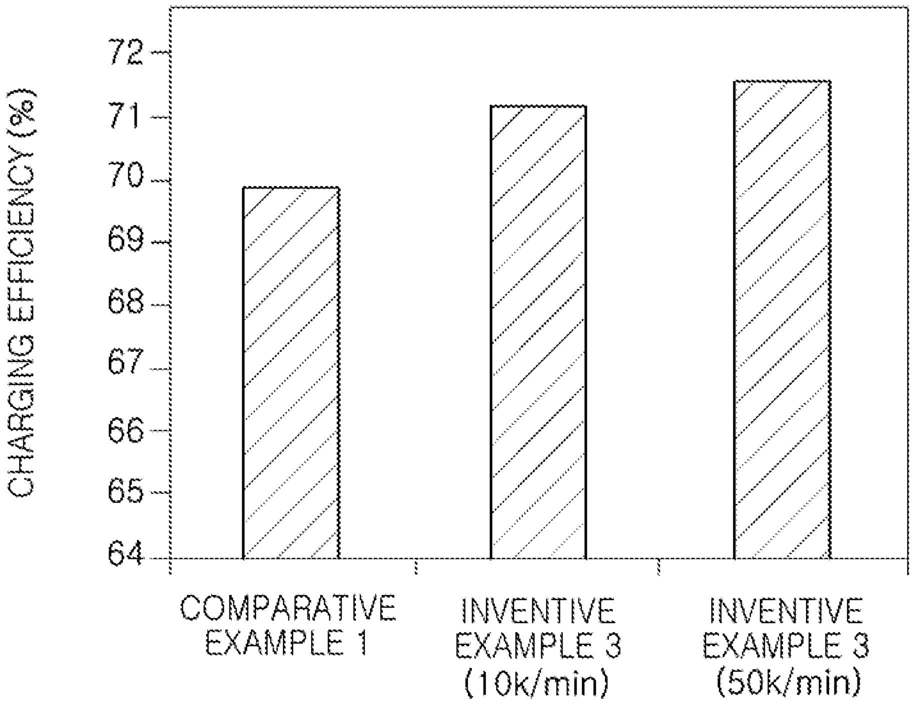

Further, the crystallization energy tendency as described above was affected by the heating rate, and in a composition exhibiting a bimodal heat generation contour, when the FIGS. 5 and 6 illustrate results obtained by comparing wireless charging efficiency of magnetic sheets formed of Fe-based nanocrystalline alloys according to the Examples and Comparative Example, wherein the result in FIG. 5 is measured using a power matters alliance (PMA) method, and the result in FIG. 6 is measured using an alliance for wireless power (A4WP) method. Referring to FIGS. 5 and 6, it may be confirmed that in magnetic sheets obtained using Fe-based nanocrystalline alloys in the compositional ranges according to the Examples, charging efficiency was significantly improved as compared to Comparative Example 1. Comparative Example 1 corresponds to a general nanocrystalline alloy, which has an advantage in that permeability is high and loss is low as compared to an existing soft magnetic material. However, in the embodiment of the composition corresponding to Example 1, one of the compositions in the compositional ranges mentioned above, actual permeability and loss characteristics were deteriorated as compared to Comparative Example 1, but content of Fe was high, such that a saturation magnetic flux density was about 1.4 T, which is higher than saturation magnetic flux density (1.2 to 1.25 T) in Comparative Example 1. Further an increase in the content of Fe as described above affected wireless charging efficiency. In addition, it was confirmed that in an example in which the Fe-based nanocrystalline alloy according to an Example was made through a heat treatment process at a faster heating rate than that of an existing alloy composition, wireless power transmission efficiency was further increased.

As described above, the results illustrated in Tables 1 and 2 and FIGS. 5 and 6 support that in the Fe-based nanocrystalline alloy within the above-mentioned compositional range, that is, the Fe-based nanocrystalline alloy represented by The Compositional Formula, $Fe_xB_ySi_zM_\alpha A_\beta$, where M is at least one element selected from the group consisting of Nb, V, W, Ta, Zr, Hf, Ti, and Mo; A is at least one element selected from the group consisting of Cu and Au; and x, y, z, α, β (based on atom %) satisfy $75\% \le x \le 81\%$, $7\% \le y \le 13\%$, $4\% \le z \le 12\%$, $16\% \le y+z \le 22\%$, $1.5\% \le \alpha \le 3\%$, and $0.1\% \le \beta \le 1.5$, respectively, permeability and core loss characteristics were excellent, and at the time of applying the Fe-based nanocrystalline alloy to the wireless charging system, charging efficiency is excellent. Hereinafter, among elements represented in the Compositional Formula of the Fe-based nanocrystalline alloy described above, elements other than Fe will be described below.

Boron (B) is an element for forming and stabilizing an amorphous phase. Since B increases a temperature at which Fe, or the like, is crystallized into nanocrystals, and energy required to form an alloy of B and Fe, or the like, which determines magnetic properties, is high, B is not alloyed while the nanocrystals are formed. Therefore, B can be added to the Fe-based nanocrystalline alloy. However, when content of B is increased to 20% or more, nanocrystallization may be difficult, and flux density Bs may be decreased.

Silicon (Si) may perform functions similar to those of B, and be an element for forming and stabilizing an amorphous phase. However, unlike B, Si may alloy with a ferromagnetic material such as Fe to decrease magnetic loss, even at a temperature at which the nanocrystals are formed, but heat generated at the time of nanocrystallization may be increased. Particularly, in a composition in which a content of Fe is high, it is difficult to control the size of nanocrystals. As illustrated in the results of Comparative Example 4 in Table 1, in an example in which the content of Fe was higher than 75 atom % and a content of Si was higher than 13 atom %, crystallization energy rapidly increased, a crystallization contour had a monomodal shape, and crystallization rapidly occurred, such that it was difficult to control the size of nanocrystalline grains. Therefore, the size of the nanocrystalline grains increased, and thus permeability decreased.

Meanwhile, both of Si and B described above, elements for forming an amorphous phase, are known as metalloids. It is known that generally, in an example in which a sum of contents of the two elements is 20 atom % or more, it is easy to form an amorphous phase. However, in order to develop a soft magnetic material having a high saturation magnetic flux density, there was a need to increase the content of Fe to 75 atom % or more. Even when a total content (Si+B) of metalloid elements was lower than 20 atom %, an amorphous phase could be formed, and when the total content was 16 atom % more, it was possible to form the amorphous phase. More particularly, in the results shown in Tables 1 and 2, it is shown that only within a certain compositional range suggested by the described embodiments, a heat generation reaction profile caused by crystallization of a nanocrystalline grain, exhibited at the time of thermal analysis, was formed in a bimodal shape.

Niobium (Nb), an element which may control a size of nanocrystalline grains, may serve to limit crystalline grains formed of Fe, or the like, to a nano size, so as not to grow through diffusion. Generally, an optimal content of Nb may be 3 atom %, but due to an increase in the content of Fe, it was attempted to form a nanocrystalline alloy in a state in which the content of Nb was lower than an existing content of Nb. As a result, it was confirmed that even in a state in which the content of Nb is lower than 3 atom %, the nanocrystalline grain was formed. Particularly, unlike general knowledge in the art, that as the content of Fe is increased, the content of Nb needs to be also increased, it was shown that in the compositional range in which the content of Fe was high and crystallization energy of the nanocrystalline grain was formed in a bimodal shape, when the content of Nb was lower than the existing content of Nb, magnetic properties were improved. It was shown that in Comparative Example 5 in which the content of Nb was high, permeability corresponding to magnetic properties was decreased, and loss was increased.

Meanwhile, copper (Cu) may serve as a seed lowering nucleation energy for forming nanocrystalline grains. In this case, there was no significant difference with a case of forming an existing nanocrystalline grain.

The Fe-based nanocrystalline alloy having the composition suggested in the embodiments described may be used in any field in which a soft magnetic component is used. The soft magnetic component is representatively used in a passive device such as an inductor and a reactor, and recently, the soft magnetic component is used in a field such as a wireless power transmission device. In the wireless power transmission device, to transmit electricity through induction even though two coils are separated from each other, a soft magnetic sheet having high permeability and low loss is used in order to prevent transmission efficiency from being decreased by waveform distortion by surrounding metal material, or the like. Particularly, in a sheet having the composition described above, charging efficiency is increased as compared to Comparative Examples corresponding to existing magnetic materials as illustrated in the accompanying figures and tables. Particularly, in a magnetic material, particularly prepared under heat treatment process conditions in which the heating rate was high, wireless power transmission efficiency was further increased.

Further, a magnetic material having the above-mentioned composition has a high saturation magnetic flux density of about 1.4 T or more, and thus, a thickness of a magnetic sheet may be decreased, advantageous in miniaturizing an electronic component using the same.

As set forth above, according to exemplary embodiments in the present disclosure, a Fe-based nanocrystalline alloy having low loss while having a high saturation magnetic flux density, and an electronic component using the same is described.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An Fe-based nanocrystalline alloy represented by $Fe_xB_ySi_zM_\alpha A_\beta$, wherein:

M is one or more elements selected from the group consisting of Nb, V, W, Ta, Zr, Hf, Ti, and Mo;

A is one or more elements selected from the group consisting of Cu and Au;

x, y, z, α, and β respectively satisfy, based on atom %, 75%≤x≤81%, 7%≤y≤13%, 4%≤z≤12%, 1.5%≤α≤3% and 0.1%≤β≤1.5%;

a differential scanning calorimetry (DSC) graph of the Fe-based nanocrystalline alloy between 470° C. and 620° C. comprises a first contour with a crystallization temperature range having an onset crystallization temperature, and between 640° C. and 720° C. a second contour narrower than the first contour;

a maximum heat amount of the first contour and a maximum heat amount of the second contour are within 0.5 W/q of each other;

a global maximum and a local maximum, which is different from the global maximum, of the first contour are both greater than a local maximum of the second contour; and wherein the second contour comprises a global minimum, the local maximum, and a local minimum in this order.

2. The Fe-based nanocrystalline alloy of claim 1, wherein 16%≤y+z≤22%.

3. The Fe-based nanocrystalline alloy of claim 1, wherein the Fe-based nanocrystalline alloy has a saturation magnetic flux density of 1.4 T or more.

4. The Fe-based nanocrystalline alloy of claim 1, wherein M is Nb.

5. The Fe-based nanocrystalline alloy of claim 1, wherein A is Cu.

6. The Fe-based nanocrystalline alloy of claim 1, wherein an onset temperature of the first contour is less than an onset temperature of the second contour.

7. The Fe-based nanocrystalline alloy of claim 1, wherein a difference in a heat amount value of the first contour and a heat amount value of the second contour is less than 1 W/g of the heat amount value.

8. An electronic component comprising:

a coil part; and a magnetic sheet adjacently disposed to the coil part, wherein the magnetic sheet contains an Fe-based nanocrystalline alloy represented by $Fe_xB_ySi_zM_\alpha A_\beta$, wherein:

M is one or more elements selected from the group consisting of Nb, V, W, Ta, Zr, Hf, Ti, and Mo;

A is one or more elements selected from the group consisting of Cu and Au;

x, y, z, α, and β respectively satisfy, based on atom %, 75%≤x≤81%, 7%≤y≤13%, 4%≤z≤12%, 1.5%≤α≤3% and 0.1%≤β≤1.5%;

a differential scanning calorimetry (DSC) graph of the Fe-based nanocrystalline alloy between 470° C. and 620° C. comprises a first contour with a crystallization temperature range having an onset crystallization temperature, and between 640° C. and 720° C. a second contour narrower than the first contour;

a maximum heat amount of the first contour and a maximum heat amount of the second contour are within 0.5 W/g of each other;

a global maximum and a local maximum, which is different from the global maximum, of the first contour are both greater than a local maximum of the second contour; and wherein the second contour comprises a global minimum, the local maximum, and a local minimum in this order.

9. The electronic component of claim 8, wherein 16%≤y+z≤22%.

10. The electronic component of claim 8, wherein the Fe-based nanocrystalline alloy has a saturation magnetic flux density of 1.4 T or more.

11. The electronic component of claim 8, wherein M is Nb.

12. The electronic component of claim 8, wherein A is Cu.

13. The Fe-based nanocrystalline alloy of claim 8, wherein a difference in a heat amount value of the first contour and a heat amount value of the second contour is less than 1 W/g of the heat amount value.

14. An Fe-based nanocrystalline alloy represented by $Fe_xB_ySi_zM_\alpha A_\beta$, wherein:

M is one or more elements selected from the group consisting of Nb, V, W, Ta, Zr, Hf, Ti, and Mo;

A is one or more elements selected from the group consisting of Cu and Au;

x, y, z, α, and β respectively satisfy, based on atom %, 75%≤x≤81%, 7%≤y≤13%, 4%≤z≤12%, 1.5%≤α≤3%, and 0.1%≤β≤1.5%;

a differential scanning calorimetry (DSC) graph of the Fe-based nanocrystalline alloy between 470° C. and 620° C. comprises a first contour having a global maximum and a local maximum spaced apart from the global maximum, between 640° C. and 720° C. a second contour having a local maximum, and each of the global maximum and the local maximum, which is different from the global maximum, of the first contour are greater than the local maximum of the second contour;

a maximum heat amount of the first contour and a maximum heat amount of the second contour are within 0.5 W/g of each other;

the first contour is wider than the second contour; and wherein the second contour comprises a global minimum, the local maximum, and a local minimum in this order.

* * * * *